United States Patent Office 3,660,510
Patented May 2, 1972

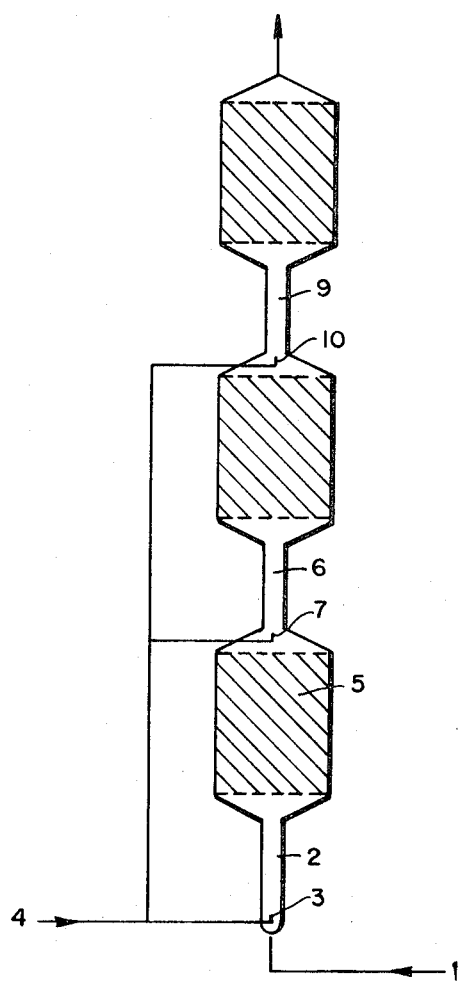

3,660,510
CATALYTICALLY DEHYDROGENATING ALKYLATED AROMATIC HYDROCARBONS
Hubert Kindler and Winfried Single, Ludwigshafen, Germany, assignors to Badische Anilin- & Soda-Fabrik Aktiengesellschaft, Ludwigshafen (Rhine), Germany
Filed Mar. 30, 1970, Ser. No. 24,035
Claims priority, application Germany, Apr. 3, 1969,
P 19 17 279.3
Int. Cl. C07c 15/10
U.S. Cl. 260—669
18 Claims

ABSTRACT OF THE DISCLOSURE

Method of catalytically dehydrogenating an alkylated aromatic hydrocarbon having at least two carbon atoms in a side-chain to a vinylaromatic hydrocarbon by rapidly passing through a catalyst zone a feedstock which has been heated to the reaction temperature and has been obtained by mixing a preheated mixture containing the alkylated aromatic hydrocarbon and optionally steam and optionally the vinylaromatic hydrocarbon with steam heated to a temperature above the temperature of reaction. The preheated mixture has a temperature of from 400° to 620° C. and the steam heated to above the reaction temperature has a temperature of from 820° to 1,100° C. and the resulting feedstock has a blend temperature of from 550° to 700° C., the time taken for mixing the preheated mixture with the heated steam being less than 0.1 second while the residence time of the resulting feedstock between the mixing point and the point of entry into the catalyst zone is less than 0.2 second. The products are important monomers and comonomers.

---

The present invention relates to an improved method of catalytically dehydrogenating alkylated aromatic hydrocarbons.

The manufacture of vinylaromatic hydrocarbons such as styrene by rapidly passing alkylated aromatic hydrocarbons and steam through a catalyst zone at high temperatures is generally known. Usually only part of the feedstock used for this reaction is converted to the vinylaromatic hydrocarbon. The product of the reaction is generally separated into the feedstock and the vinylaromatic hydrocarbon by distillation.

The dehydrogenation of an alkylated aromatic hydrocarbon is a highly endothermic reaction. Thus the amount of dehydrogenated hydrocarbon is dependent on the amount of heat supplied to the reactor per unit of alkylated aromatic hydrocarbon. Large-scale processes may be divided into essentially two types. The first type of process comprises passing a preheated mixture of alkylated aromatic hydrocarbon and steam through tubes containing the catalyst and also externally heated by a heating medium such as flue gases. In this process the temperature of reaction is kept approximately constant along the length of the catalyst bed. However, the manufacture of the tubular reactors required for this process is relatively costly and the reactors can be made in limited sizes only. In the other type of process the heat required for the reaction is provided by the heat content of the mixture of alkylated aromatic hydrocarbon and steam, that is, the dehydrogenation is carried out adiabatically. The mixture is passed over a fixed catalyst bed (shaft kiln), where it cools as the degree of conversion increases. Commercial processes involving adiabatic reaction procedure require relatively large quantities of steam ranging from about 2 to 3 kg. per kg. of alkylated aromatic hydrocarbon. The yields of styrene in this process are about 90%, while the conversion achieved is about 38%.

Heating of the mixture of alkylated aromatic hydrocarbon and steam to the temperature of reaction may be effected either by indirect heat transfer to the said mixture through an externally heated tube wall or by direct admixture of hot steam to the starting hydrocarbon or by a combination of both methods. In the known processes the superheated steam used for such admixture has temperatures between 650° and 800° C., preferably between 725° and 775° C.

German published application DAS No. 1,169,918 discloses a method of dehydrogenating an alkylated aromatic hydrocarbon utilizing a number of catalyst beds in series in which only a fraction of a predetermined total quantity of superheated steam is added to the charge containing alkylated aromatic hydrocarbon before entering each reactor such that the total amount of superheated steam to be added is distributed over the several reactors. Although conversions of up to approximately 50% are achieved on passing the hydrocarbon to be dehydrogenated only once through the series of reactors, this process calls for relatively large amounts of steam.

It is an object of the present invention to provide a method of catalytically dehydrogenating an alkylated aromatic hydrocarbon having at least two carbon atoms in a side-chain, in which very good yields are achieved at conversions of up to as high as 60%. Another object is to provide a process in which smaller quantities of steam are required than in the previously known processes.

In accordance with the present invention these and other objects and advantages are achieved in a method of catalytically dehydrogenating an alkylated aromatic hydrocarbon having at least two carbon atoms in a side-chain to a vinyl-aromatic hydrocarbon by rapidly passing through a catalyst zone a feedstock which has been heated to the reaction temperature and has been obtained by mixing a preheated mixture containing the alkylated aromatic hydrocarbon and optionally steam and optionally the vinylaromatic hydrocarbon with steam heated to a temperature above the temperature of reaction, wherein the preheated mixture has a temperature ranging from 400° to 620° C. and the steam heated to above the temperature of reaction has a temperature ranging from 820° to 1,100° C. and the resulting feedstock has a blend temperature of from 550° to 700° C., the time taken for mixing the preheated mixture with the heated steam being less than 0.1 second while the residence time of the resulting feedstock from the mixing point to the point of entry into the catalyst zone is less than 0.2 second.

A preferred embodiment of the method comprises passing the feedstock through a number of catalyst zones in series, the reaction mixture leaving any one catalyst zone being heated to the temperature of reaction before it enters the following catalyst zone, such heating being effected by admixing steam heated to above the temperature of reaction and/or by indirect application of heat.

Styrene is produced by our new method in very good yields without the formation of large quantities of tar or other by-products such as benzene, toluene or gases such as carbon dioxide, carbon monoxide or hydrogen. This is surprising because German published application DAS No. 1,109,164 reveals that when ethyl benzene, for example, is mixed with steam heated to temperatures of about 700° to 800° C., some of the ethyl benzene reaches temperatures at which pyrolysis occurs and consequently, not only is the yield of styrene reduced but also large quantities of tar are formed. The finding that the use of steam heated to temperatures ranging from 820° to 1,100° C. avoids these disadvantages was therefore unexpected.

The catalyst beds used in the new method may be of the fixed type. Altenatively, the catalyst may be used in fluidized beds. The reactors may be additionally equipped with heat-exchange surfaces by means of which extra heat can be applied to the catalyst zones from a heat carrier such as hot flue gases. Preferably, however, the method is worked according to a procedure in which the heat required for the reaction is provided by the heat contained in the feedstock alone.

Examples of alkylated aromatic hydrocarbons which may be used as starting materials are isopropyl benzene, ethyl chlorobenzene, ethyl naphthalene and, in particular, ethyl benzene.

Conventional dehydrogenating catalysts may be used for the process of the invention. Suitable catalysts are, for example, iron oxide/chromium oxide/potassium oxide catalysts, iron oxide/zinc oxide/potassium oxide catalysts, aluminum oxide/zinc oxide/magnesium oxide catalysts (of U.S. Pat. No. 3,335,197), iron oxide/zinc oxide/vanadium oxide/alkali metal chromate catalysts (cf. German published application DAS 1,265,740), zinc oxide/aluminum oxide/calcium oxide/magnesium oxide/alkali metal oxide catalysts (cf. Ohlinger-Stadelmann: "100 Jahre BASF-Aus der Forschung" (1965) 417) and chromium-free iron catalysts (cf. Polish Pat. No. 54,340). Other suitable dehydrogenating catalysts for the process are those described in Ullmanns Encyklopädie der technischen Chemie, 3rd edition 1965, pp. 466 to 471.

The number of catalyst zones in the series is generally from 1 to 5 and preferably 2 or 3. Depending on the number of catalyst zones used, the amount of catalyst and the reaction temperatures used, the conversion obtained is generally from 35 to 60%. The method is preferably carried out so that conversions between 40 and 50% are obtained. When a number of catalyst beds are used the ratio of the conversion rates in the different catalyst beds to each other may vary within wide limits. In general, the conversion rates in the individual catalyst beds are set at similar levels. However, they may differ from each other by a factor of, say, 2 to 3 approximately.

The reaction temperatures used in the present process are generally between 500° and 700° C., preferably between 550° and 650° C.

In the method of the invention steam is used at temperatures ranging from 900° to 950° C. This superheated steam is mixed with a mixture containing the alkylated aromatic hydrocarbon and, optionally, steam and, again optionally, the vinylaromatic hydrocarbon, in order to form the feedstock, the said mixture being preheated to a temperature between 400° and 620° C., preferably between 500° and 600° C. The temperature of the resulting feedstock after mixing is generally between 550° and 700° C., preferably between 570° and 650° C. In the present process there is conveniently used a total of from 0.7 to 2.0 kg., preferably from 0.9 to 1.5 kg. and more preferably from 0.9 to 1.2 kg. of steam per kg. of alkylated aromatic hydrocarbon. The superheated steam used in the present method may be added to the preheated mixture containing the alkylated aromatic hydrocarbon and, optionally, the vinylaromatic hydrocarbon without the said mixture containing any steam beforehand. Usually, however, the preheated hydrocarbon mixture already contains steam, which ranges in general from 5 to 20% by weight of the total amount of steam to be used.

The time taken to mix the superheated steam with the preheated hydrocarbon mixture is less than 0.1 second and preferably less than 0.04 second. This time is taken to be the mean residence time of the mixture from the point at which the two streams meet to the point where virtually complete equilibrium of temperature and concentration has been achieved. The residence time of the resulting feedstock from the mixing point to the point of entry into the catalyst zone is less than 0.2 second and preferably less than 0.07 second.

Where the feedstock passes through a series of catalyst zones, the reaction mixture leaving any one of the catalyst zones will be reheated to reaction temperature before entering the next catalyst zone. Such heating may be effected, for example, by indirect application of heat using a heat exchanger. In a preferred embodiment, however, the reaction mixture leaving any of the catalyst zones is reheated by the addition of superheated steam as used in the present invention. Of the total amount of superheated steam at temperatures between 820° and 1,100 C. to be used proportions are added prior to each catalyst zone in such a manner that the ratio of the said proportion added prior to the next catalyst zone ranges from about 0.5 to 2, preferably from 0.7 to 1.5.

The steam added at the mixing point or points is introduced at a rate adapted to achieve the desired blend temperature, i.e. the desired temperature of the feedstock after mixing. The proportions of the components depend on the temperature of the superheated steam and that of the mixture containing the starting hydrocarbon and also on the composition of the mixture containing the hydrocarbon and may be readily calculated from the temperatures and composition.

The operation of mixing the superheated steam used in accordance with the present invention with the preheated mixture containing the starting hydrocarbon is conveniently carried out in tubes or mixing chambers through which the components flow and which are adapted to provide the rapid mixing required by the invention. Rapid mixing is achieved, for example, by passing the superheated steam through one or more nozzles, for example from 2 to 5 nozzles, at high velocity, for example a velocity of up to 300 m./s., centrally or tangentially into the starting hydrocarbon-containing mixture flowing through a tube. Beyond this mixing point there is conveniently a mixing zone characterized by turbulent flow. Such turbulent flow may be produced, for example, by high velocities, such as velocities ranging from 5 to 100 m./s., by a velocity differential between the streams to be mixed, such as a velocity of 10:1, and/or by providing additional inserts, such as orifice plates or baffles.

The residence times to be observed in accordance with the present invention from the mixing point to the point of entry into the catalyst zone are essentially influenced by the velocity of the feedstock stream and the length of the zone between the mixing point and the said point of entry. The velocity and length of zone required to achieve the desired residence time may be simply determined, for example by calculation.

The method of the invention is described below with reference to examples.

EXAMPLE 1

3.0 kg./hr. of ethyl benzene mixed with 0.46 kg./hr. of steam are passed through pipe 1 (see accompanying figure) to a mixing tube 2 of 26 mm. diameter and 130 mm. length, the mixture being preheated to 590° C. Concurrently, 0.76 kg./hr. of steam at 900° C. is passed through pipe 4 and a central nozzle 3 of 8 mm. diameter. After flowing through a mixing zone corresponding to a mean residence time of 0.03 second the resulting feedstock exhibits only small temperature differences of from 2 to 4° C. over the cross-section of the mixing tube. On leaving the mixing tube the feedstock passes at a temperature of 640° C. into a catalyst bed 5. The mean residence time of the mixture from the mixing nozzle to the point of entry into the catalyst bed is 0.044 second. The catalyst bed is composed of particles of catalyst measuring 5 mm. in diameter and about 7 mm. in length and having the composition: 88% w/w. of $Fe_2O_3$, 2% w/w. of $Cr_2O_3$ and 10% w./w. of $K_2O$. The reaction mixture leaving the first catalyst zone has a temperature of 570° C. It passes into a second mixing tube 6 to which 1.04 kg./hr. of steam is passed through a central nozzle 7, the steam having a temperature of 900° C. The resulting mixture has a temperature of 630° C. It passes through a second catalyst zone containing the same catalyst and cools to 580° C. It then passes through a third mixing tube 9, in which it is heated to 617° C. by 0.74 kg./hr. of steam at 900° C.

added through nozzle 10. The resulting mixture then passes into a third catalyst zone. The reaction mixture leaving the third catalyst zone has a temperature of 585° C. Immediately prior to entry into each mixing tube and catalyst bed and after leaving the third catalyst bed the feedstock or the reaction mixture, as the case may be, is sampled, and from these samples, after cooling, a hydrocarbon layer is separated for analysis by gas chromatography. In addition, the amounts of non-condensable gases (substantially hydrogen and carbon dioxide) were measured. The results are given in the following table:

| Sample taken: | Styrene (percent) | Benzene (percent) | Toluene (percent) | Styrene gas (1/kg. S.T.P.) |
|---|---|---|---|---|
| Prior to 1st mixing tube | 0.10 | 0.11 | 0.13 | |
| Prior to 1st catalyst bed | 0.50 | 0.13 | 0.14 | |
| Prior to 2d mixing tube | 18.65 | 0.23 | 0.43 | 340 |
| Prior to 2d catalyst bed | 18.80 | 0.23 | 0.44 | 340 |
| Prior to 3d mixing tube | 33.38 | 0.48 | 0.89 | 340 |
| Prior to 3d catalyst bed | 33.67 | 0.49 | 9.90 | 346 |
| After 3d catalyst bed | 43.37 | 0.70 | 1.33 | 350 |

As may be seen from the table, only very small quantities of styrene are formed by merely mixing ethyl benzene or ethyl benzene/styrene mixtures with steam at 900° C., that is, before entering the catalyst beds. Moreover, virtually no by-products are formed in the mixing tubes. The total yield of styrene is 93% of theory and the tar content in the final reaction product is 0.12%.

EXAMPLE 2

Dehydrogenation is carried out in similar apparatus to that described in Example 1. The mixing tubes used are tubes of 20 mm. diameter and 150 mm. length, which contain five segment-shaped orifice plates covering 65% of the internal cross-section of the tube.

| | | | Composition of hydrocarbon layer | | |
|---|---|---|---|---|---|
| Point of feed or measurement | Feed of— | Temp. (° C.) | Styrene (percent) | Benzene (percent) | Toluene (percent) |
| Prior to 1st mixing tube | Ethyl benzene steam mixture (3.0/0.3 kg./hr.). | 580 | 0.18 | 0.11 | 0.12 |
| | Steam (0.74 kg./hr.) | 950 | | | |
| After 1st mixing tube | | 640 | 0.50 | 0.13 | 0.14 |
| After 1st catalyst bed | | 570 | 18.65 | 0.23 | 0.43 |
| Prior to 2d mixing tube | Steam (0.84 kg./hr.) | 950 | | | |
| After 2d mixing tube | | 630 | 18.84 | 0.25 | 0.45 |
| After 2d catalyst bed | | 570 | 36.55 | 0.65 | 1.15 |
| Prior to 3d mixing tube | Steam (1.12 kg./hr.) | 950 | | | |
| After 3d mixing tube | | 637 | 36.76 | 0.68 | 1.18 |
| After 3d catalyst bed | | 600 | 48.27 | 0.87 | 1.95 |

The tar content of the reaction product is 0.20% and 255 l./kg. (S.T.P.) of styrene is produced as gas. The yield of styrene is 92% of theory.

EXAMPLE 3

Dehydrogenation is effected with apparatus similar to that described in Example 1, but using only two catalyst beds.

The reaction product was found to contain 0.15% of tar. The exhaust gas comprises 353 l./kg. (S.T.P.) of styrene. The yield of styrene is 93% of theory.

EXAMPLE 4

Using a mixing tube of the kind described in Example 1, a mixture of 1.6 kg./hr. of ethyl benzene and 0.4 kg./hr. of steam at 851° C. is produced, the temperature of the mixture being 650° C. In the hydrocarbon layer the concentration of styrene rises from 1.10% to 2.04%, that of benzene from 0.30% to 0.50% and that of toluene from 0.20% to 0.28%.

We claim:

1. In a process for catalytically dehydrogenating an alkylated aromatic hydrocarbon having at least two carbon atoms in a side-chain to form a vinylaromatic hydrocarbon wherein a preheated mixture of steam and said alkylated aromatic hydrocarbon is rapidly passed through at least one catalyst zone, the improvement which comprises: preheating a feedstock containing said alkylated aromatic hydrocarbon to a temperature of from 400 to 620° C. and passing a stream of said feedstock into a mixing zone; passing steam heated to a temperature of from 820° to 1100° C. into said feedstock in said mixing zone whereby the temperature of the resultant mixture is from 550 to 700° C. and whereby the time taken to mix said feedstock and said steam is less than 0.1 second while the residence time of the resultant mixture from the mixing point to the point of entry into the catalyst zone is less than 0.2 second; and immediately thereafter passing said mixture of feedstock and steam rapidly through at least one catalyst zone.

2. A process as in claim 1 wherein the feedstock passes through a number of catalyst zones arranged in series, the reaction mixture leaving any one of the said catalyst zones being heated to the temperature of reaction before it enters the next catalyst bed by admixing steam heated to a temperature above the temperature of reaction and/or by applying heat indirectly.

3. A process as in claim 1 wherein the total quantity of steam used is from 0.7 to 2.0 kg. per kg. of alkylated aromatic hydrocarbon.

4. A process as in claim 1 wherein said feedstock is a preheated mixture of said alkylated aromatic hydrocarbon and steam.

5. A process as in claim 1 wherein said feedstock is a preheated mixture of said alkylated aromatic hydrocarbon, steam, and vinylaromatic hydrocarbon.

| | | | Composition of hydrocarbon layer | | |
|---|---|---|---|---|---|
| Point of feed or measurement | Feed of— | Temp. (° C.) | Styrene (percent) | Benzene (percent) | Toluene (percent) |
| Prior to 1st mixing tube | Ethyl benzene/steam mixture (6.0/1.2 kg./hr.). | 550 | 0.10 | 0.10 | 0.12 |
| | Steam (2.7 kg./hr.) | 950 | | | |
| After 1st mixing tube | | 650 | 0.52 | 0.17 | 0.15 |
| After 1st catalyst bed | | 570 | 25.28 | 0.45 | 0.68 |
| Prior to 2d mixing tube | Steam (3.0 kg./hr.) | 900 | | | |
| After 2d mixing tube | | 636 | 25.62 | 0.49 | 0.72 |
| After 2d catalyst bed | | 575 | 45.18 | 0.70 | 1.41 |

6. A process as in claim 1 wherein said feedstock is preheated to a temperature of from 500 to 600° C.

7. A process as in claim 1 wherein said steam which is passed into said feedstock in said mixing zone is heated to a temperature of from 850 to 950° C.

8. A process as in claim 1 wherein said steam which is passed into said feedstock in said mixing zone is heated to a temperature of from 900 to 950° C.

9. A process as in claim 7 wherein said resultant mixture has a temperature of from 570 to 650° C.

10. A process as in claim 1 wherein said time to mix said steam and said feedstock within said mixing zone is less than 0.04 second and the residence time of said mixture from the mixing point to the point of entry into the catalyst zone is less than 0.07 second.

11. A process as in claim 4 wherein said steam which is passed into said feedstock in said mixing zone is heated to a temperature of from 850 to 950° C.

12. A process as in claim 11 wherein said resultant mixture has a temperature of from 570 to 650° C.

13. A process as in claim 4 wherein said feedstock is preheated to a temperature of from 500° to 600° C.

14. A process as in claim 4 wherein said steam which is passed into said feedstock in said mixing zone is heated to a temperature of from 900° to 950° C.

15. A process as in claim 5 wherein said feedstock is preheated to a temperature of from 500 to 600° C.

16. A process as in claim 5 wherein said steam which is passed into said feedstock in said mixing zone is heated to a temperature of from 850° to 950° C.

17. A process as in claim 5 wherein said steam which is passed into said feedstock in said mixing zone is heated to a temperature of from 900° to 950° C.

18. A process as in claim 16 wherein the resultant mixture has a temperature of from 570° to 650° C.

References Cited
UNITED STATES PATENTS

| | | | |
|---|---|---|---|
| 3,118,006 | 1/1964 | Lovett et al. | 260—669 |
| 3,326,996 | 6/1967 | Henry et al. | 260—669 |
| 3,475,508 | 10/1969 | King | 260—669 |
| 3,498,756 | 3/1970 | Carson | 260—669 X |

CURTIS R. DAVIS, Primary Examiner

UNITED STATES PATENT OFFICE
CERTIFICATE OF CORRECTION

Patent No. 3,660,510          Dated May 2, 1972

Inventor(s) Hubert Kindler and Winfried Single

It is certified that error appears in the above-identified patent and that said Letters Patent are hereby corrected as shown below:

Column 3, line 42, "from 900°" should read -- from 820° to 1,100° C, preferably from 850° to 950° C and more preferably from 900° --.

Column 4, line 2, "apreferred" should read -- a preferred --.

Column 5, in the table, line 22, "18,80" should read -- 18.80 --; line 23, "340" should read -- 344 --.

Signed and sealed this 21st day of November 1972.

(SEAL)
Attest:

EDWARD M. FLETCHER, JR.
Attesting Officer

ROBERT GOTTSCHALK
Commissioner of Patents